(No Model.)
A. V. RYDER.
HARROW.
No. 585,941. Patented July 6, 1897.
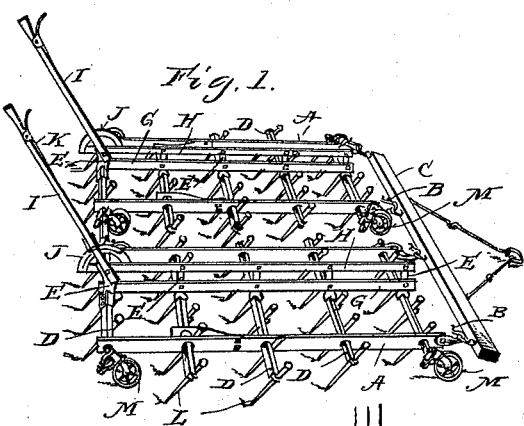
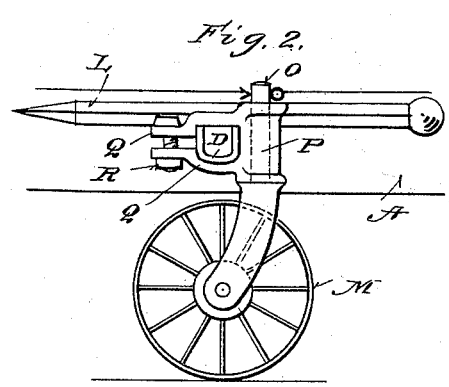
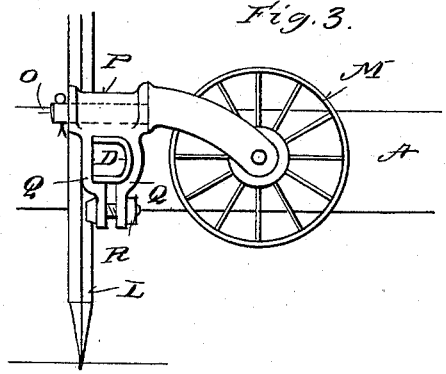
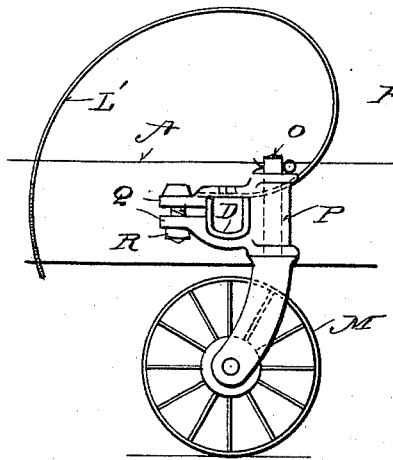
Witnesses
J. C. Dawley.
W. M. McNair.
Inventor
Andrew V. Ryder,
By his Attorney
H. A. Toulmin.

UNITED STATES PATENT OFFICE.

ANDREW V. RYDER, OF SCIO, OHIO.

HARROW.

SPECIFICATION forming part of Letters Patent No. 585,941, dated July 6, 1897.

Application filed May 22, 1896. Serial No. 592,680. (No model.)

*To all whom it may concern:*

Be it known that I, ANDREW V. RYDER, a citizen of the United States, residing at Scio, in the county of Harrison and State of Ohio, have invented certain new and useful Improvements in Harrows, of which the following is a specification, reference being had therein to the accompanying drawings.

This invention relates to certain new and useful improvements in harrows for breaking up the soil.

The essential object of my invention is to provide a harrow with carrying-wheels so arranged with relation to the tooth-bars of the harrow that as the latter are swung from the ground such wheels come down upon the ground, whereby the harrow will be supported in part by the teeth and in part by the wheels to lessen the depth the teeth will enter the ground or whereby the harrow will be wholly supported by the wheels and the teeth entirely elevated from the ground, as when it is desired to draw the machine from place to place without harrowing.

To this end my invention consists, essentially, of a harrow having a series of rolling tooth-bars, to several of which are attached suitable wheels in such wise that on rolling these bars in one direction the teeth will leave the ground and the wheels will come down upon the ground, and on rolling these bars and elevating the wheels the wheels will leave the ground and the teeth will come down upon the ground, and in such wise that both the wheels and the teeth may rest at the same time upon the ground.

In the accompanying drawings, on which like reference-letters indicate corresponding parts, Figure 1 is a perspective view of one type of harrow embodying my invention and showing the intermediate adjustment in which the wheels and teeth are both upon the ground; Fig. 2, an enlarged detail view showing the wheel on the ground and the teeth elevated, as when transporting the machine from place to place; Fig. 3, a similar view with the wheel above the ground and the teeth on the ground, as when harrowing; and Fig. 4, another similar view showing the wheel on the ground and another form of harrow-tooth—namely, a spring-tooth.

The letter A designates the beams of a harrow-frame, to which the draft-clevises B are attached, and to which clevises the draft-bar C is connected. In the beams A are rotatably mounted a series of tooth-beams D, adapted to be rocked by a lever mechanism consisting of a series of arms E, secured to the tooth-beams and connected by parallel bars G and H. To the rear arm E is fixed a lever I and to the bar H is fixed a toothed segment J. When the toothed bars are to be rocked, the lever is moved forward or backward, and when in the desired position the lever is locked to the segment through the usual detent K, carried by the lever. This is one form of harrow with which my invention may be used. This harrow in the example shown is made in two sections, but my invention may be used with a harrow composed of one or more sections and otherwise differing from the one illustrated.

The rocking tooth-bars D carry each a series of harrow-teeth L. By rocking the tooth-bars the teeth are adjusted at the proper angle to the ground, from an incline to a perpendicular. Now in carrying out my invention I apply to some of these rocking tooth-bars or their equivalents wheels M, preferably of the caster-wheel type, as shown. On the shank O of these wheels is fitted a clip E, whose branches Q are adapted to embrace the tooth-bars D and to which they are clamped in any suitable manner, as by a nut and bolt R. I place the clip in such wise that the shank of the wheel is practically at right angles to the teeth or at any suitable angle so that when the teeth are in a vertical position, or nearly so, the wheels will be above the ground and so that when the wheel-shanks are in a vertical position, or nearly so, the teeth will be clear of the ground, and also in such wise that both the wheels and the teeth may be upon the ground at the same time, as suggested in Fig. 1, in which position the teeth will harrow lightly.

It will be seen that on rocking the tooth-bars the teeth may be brought upon the ground and the wheels elevated or the wheels brought upon the ground and the teeth elevated. To harrow lightly, I adjust as in Fig. 1. To harrow deeply, I adjust as in Fig. 3. To travel from place to place without harrowing, I adjust as in Figs. 2 and 4, when the teeth are more or less clear of the ground. Thus by a simple manipulation of the hand-lever the harrow may be adjusted for fieldwork or for traveling.

It will also be seen that my device is applicable to harrows of various known types and may be applied to harrows already in use. I have shown two forms of teeth, stiff teeth and spring-teeth, the latter being illustrated in Fig. 4 at L'.

Having thus fully described my invention, what I claim as new, and desire to secure by Letters Patent, is—

1. In a harrow, the combination with rocking bars having harrow-teeth, and means to rock said bars, of clips secured to said bars, a shank mounted in each clip, and a wheel mounted in each shank, said shanks being at an angle to said teeth.

2. In a harrow, the combination with rocking bars having harrow-teeth, and means to rock said bars, of clips secured to said bars, a shank rotatably mounted at its upper end in each clip, and a wheel mounted in the lower end of each shank, said shanks with their axes being at an angle to the said teeth.

3. A harrow attachment consisting of a wheel, a caster-shank in which the wheel is mounted and a clip in which said shank is mounted, the clip having jaws, and a fastening device to clamp said jaws to a harrow-bar.

In testimony whereof I affix my signature in presence of two witnesses.

ANDREW V. RYDER.

Witnesses:
E. G. SMITH,
GEORGE H. WITHEY.